July 21, 1925.

A. V. BARANOFF

APPARATUS FOR TEACHING GUNNERY

Filed Nov. 1, 1921        7 Sheets-Sheet 1

Inventor
A. V. Baranoff,
By Marks & Clerk
Attys.

July 21, 1925.

A. V. BARANOFF 1,546,880

APPARATUS FOR TEACHING GUNNERY

Filed Nov. 1, 1921        7 Sheets-Sheet 2

Inventor
A. V. Baranoff,
By Marks & Clerk
Attys.

July 21, 1925.

A. V. BARANOFF 1,546,880

APPARATUS FOR TEACHING GUNNERY

Filed Nov. 1, 1921

Inventor
A. V. Baranoff
By Marks & Clerk
Attys.

July 21, 1925.

A. V. BARANOFF 1,546,880

APPARATUS FOR TEACHING GUNNERY

Filed Nov. 1, 1921     7 Sheets-Sheet 6

Inventor
A. V. Baranoff
By Marks & Clerk
Attys.

July 21, 1925.  1,546,880
A. V. BARANOFF
APPARATUS FOR TEACHING GUNNERY
Filed Nov. 1, 1921  7 Sheets-Sheet 7
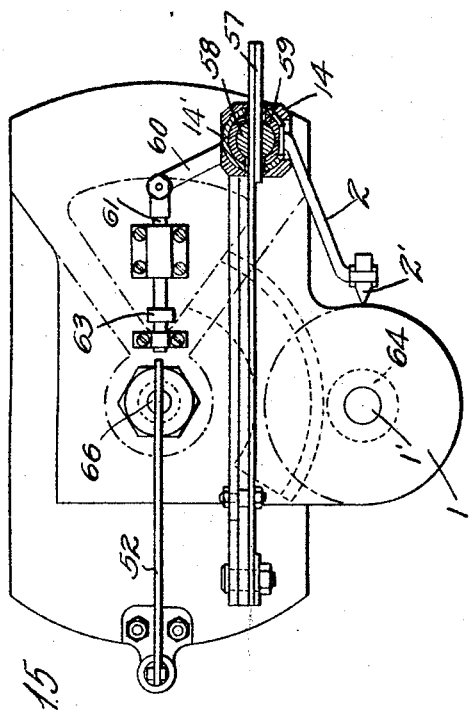
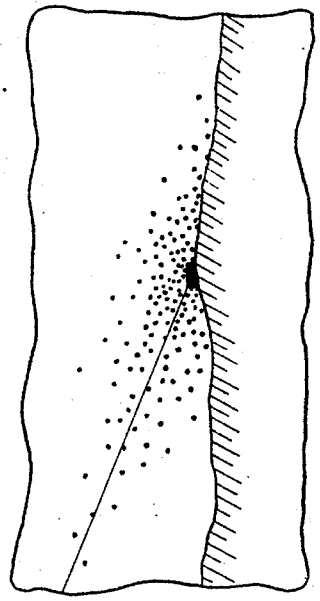
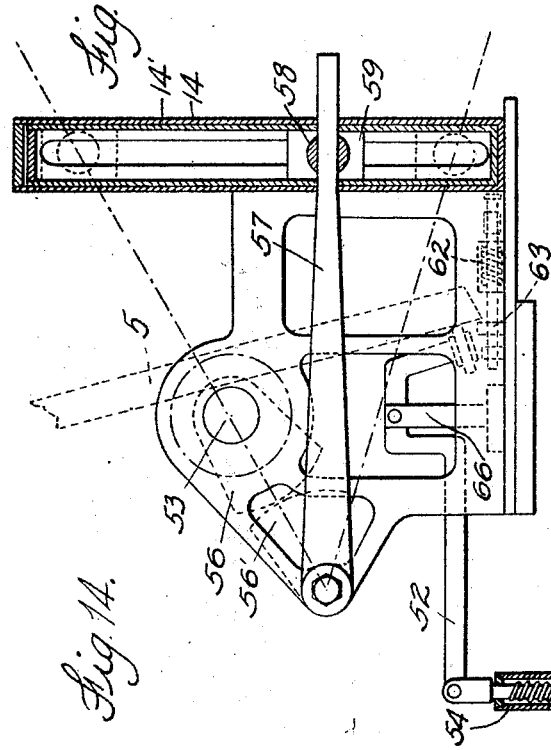
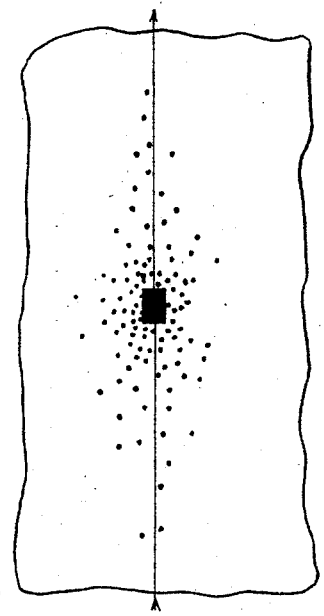
Inventor.
A. V. Baranoff
By Markes Clerk
Attys Patented July 21, 1925.

1,546,880

UNITED STATES PATENT OFFICE.

ANDRÉ VALENTIN BARANOFF, OF FONTAINEBLEAU, FRANCE.

APPARATUS FOR TEACHING GUNNERY.

Application filed November 1, 1921. Serial No. 512,136.

*To all whom it may concern:*

Be it known that I, ANDRÉ VALENTIN BARANOFF, engineer, citizen of Russia, residing at Fontainebleau, Department of Seine et Marne, in France, and having P. O. address, 4 Rue du Roussillon, in the said city, have invented certain new and useful Improvements in Apparatus for Teaching Gunnery; and I do hereby declare the following to be a full, clear, and exact description of the invention, such as will enable others skilled in the art to which it appertains, to make and use the same.

The present invention relates to apparatus which is capable of replacing the system of shooting on the firing range or elsewhere when giving instruction in gunnery, and its object consists in combining in a single suitable apparatus all the elements necessary for giving an exact reproduction of the shooting and permitting an instructor to analyze and justify the general rules applying to artillery shooting. The apparatus also permits problems relating to percussion firing and those dealing with time fuse firing to be treated with the same facility, and also records to be preserved of all the shots fired, which is an essential point.

The principle of the apparatus, to which it is necessary to refer before describing the different parts constituting the latter, includes the following points:—

1. The usual range tables serve as a basis for the apparatus.

2. The field of fire is replaced by the objective zone and by an imaginary battery.

3. The dummy shell is captive, that is to say it is fixed to the end of a movable lever perpendicular to the line of fire. The lever, which is articulated, by means of a mechanical device causes the shell to be displaced in space.

4. To prevent hindrance in observation and to facilitate manipulation, the apparatus comprises two parallel fields placed side-by-side and identical in their dimensions.

It is known that by means of mechanical manipulations of the different parts of the gun and the shell such as laying, fuse setting, etc., it is possible to change the path of a projectile in space and the position of the point of burst. For example, by varying the angle of fire the point of impact of the shell is caused to recede from or to be brought nearer to the gun, and by altering the corrector the point of burst ascends or descends on its trajectory and so forth.

If, then, in accordance with the data of a range table for any gun, an apparatus were available which, following the orders and in accordance with the possible dispersion in direction, in range and in height would move a dummy shell in space as a gun would do, this apparatus would obviously be suitable for replacing the gun for instruction purposes. The object of the present invention is to provide such an apparatus.

In order to permit the apparatus to be kept within reasonable dimensions, the field of fire is replaced by the objective zone and by the imaginary battery; the commander of a battery does not need to consider the latter, the point of interest to him being to ascertain whether the battery is carrying out his orders correctly in the objective zone and this zone suffices to enable the apparatus to fulfil its functions completely.

The reduction adopted may conveniently be 1/1000 so that the whole apparatus can be placed in a room of average size.

In order to allow the captive shell to occupy easily the different positions in space assigned to it by the orders and dispersion, the articulated shell-carrying lever moved by the mechanical device guides the point of burst in the plane of fire to the spot indicated. The mechanical device may displace the lever, and consequently the shell, in the line of fire in fourteen different displacements. These displacements are made with respect to three axes, viz: for direction, for range and for height, and the directions in which the carriage, and consequently the dummy shell-carrying lever mounted thereon, is constrained to move are indicated by the arrows in Figs. 12 and 13.

The purpose of each displacement is as follows: No. 1 deflection; No. 2 dispersion in direction; No. 3 elevation; No. 4 angle of sight for percussion fire; No. 5 dispersion in range; No. 6 corrector for fuse; No. 7 angle of sight for time-fuse fire; No. 8 corrector for height of burst; No. 9 angle of sight for height of burst; No. 10 dispersion in height; No. 11 fuse setting; No. 12 dispersion in range for time-fuse fire; No. 13 departure of shell; No. 14 change of altitude in firing position of battery. These various displacements will be more particularly described subsequently in connection with the various members of the recording instrument by which they are effected.

To prevent hindrance in observation and to facilitate manipulation, the apparatus according to the invention comprises two parallel fields. One, a field of observation $P^1$ (Fig. 1) represents a plan in relief of an objective zone, for example, a part of the known front taken as an objective, the manœuvring field P represents a contour map for this zone and is on the same scale. All the shots marked in the field P are reproduced by means of a lever arm M, $M^1$ in the field $P^1$. The point $M^1$ occupies the same position in the field $P^1$ as that occupied by the point M in the field P, Figs. 1, 2 and $2^1$. In Fig. $2^1$ the line of fire and the trajectory are shown in perspective.

It will now be explained how a percussion or time fuse shot can be laid for direction and range by means of the two parallel fields.

It is known that in order to aim a gun at an objective it is necessary to make the line of fire from the gun pass through the objective.

Let us imagine a rectangular horizontal field R, Fig. 3, and assume that a gun B is sighted on the point $b$ the gun and this point both being located on the axis X, $X^1$ of the plan. If it is desired to fire at the objective M it is necessary to move the gun and give to its line of fire an angle $\alpha$ with relation to the observation line X, $X^1$, in other words, it is necessary to traverse the gun. If instead of traversing the whole field of fire B$b$ only a part is pivoted, for example $a\,b$, the result, relatively to the field R, will be the same.

In order to obtain the inclination $a$ of the line of fire with relation to the observation line, it is necessary to displace the two extremities of the trace of the observation line, namely $a$ and $b$ by amounts equal to the distances $a$K and $b$L; these amounts correspond to those of the tangents of the angle $\alpha$ for the bases B$a$ and B$b$, in the triangles B$a$K, B$b$L, they are given in metres in the range tables. (See the range tables: change of position of the point of impact for a variation of one division on the horizontal angle drum).

For another gun $B^1$ laid on the same objective M the angle will have the value $\beta$ and the tangents will be represented by the distances $a$$K^1$ and $b$$L^1$ for the bases $B^1a$ and $B^1b$ in the triangles $B^1a$$K^1$, $B^1b$$L^1$. It will be observed, therefore, that on withdrawing the gun further from the objective zone the line of fire will have different inclinations for the same objective. The lengths $a$K and $b$L change according to the distances B$a$ and B$b$ and the angles (dial sight angle between aiming point and line of fire); for a gun at infinity KL would be parallel to $a\,b$ and $a$K would be equal to $b$L.

By tracing on the horizontals C, $C^1$ and D, $D^1$ of the field the numerical values of the tangents which correspond to the angles (dial sight angle between aiming point and line of fire) and to the distances B$a$, B$b$, it would be possible by displacing correctly the extremities $a$ and $b$ to pivot the part $a\,b$ around the imaginary axis B, which would assume the same inclination as the firing line B, L of the gun B. Thus, by giving a suitable inclination to the part $a, b$, it is possible to make the line of fire of a gun pass through the objective without the gun actually existing.

The laying for range remains to be considered; it is necessary to give the elevation, that is to say, the angle which corresponds to the objective. In order to obtain the desired result it is necessary to change the point of burst of the projectile in the line K, L. For this purpose let us assume that the scale C, $C^1$ (Fig. 4) represents the layout of the line of fire K, L in the objective zone, and that a slider Q can slide along the entire length of the said scale. Let us further assume that the scale C, $C^1$ is graduated and that its divisions correspond to those of the range drum, for example in divisions of 25 metres or in degree and minutes. In causing the slider Q to move along the scale an alteration in range of the point T is obtained in the line of fire K, L. The movement of the scale along the straight lines D, $D^1$ and E, $E^1$, as well as the sliding of the slider Q on the said scale, thus permits the point T to coincide with any point on the plan P.

As has been stated above, all the shots M marked in the manœuvring field P (Fig. 5) are projected onto the observation field $P^1$ by means of an arm M, $M^1$. For small distances, however, the positions are not identical, because the lever always remains in the position perpendicular to the scale C, $C^1$ during the movement of the slider Q. Referring to Fig. 5, it will be noted that the extremity of the arm is at $M^{11}$ whilst the symmetrical position is at $M^1$. In order to obtain the desired symmetry the arm should turn about the point M by an angle $\alpha$; this angle is equal to the angle $\beta$ (dial sight angle between aiming point and line of fire) of the gun. To make this movement possible, the platform carrying the arm M, $M^1$ should be capable of turning about an axis in the slider Q.

The foregoing remarks enable the principle to be easily grasped which governs the apparatus when it is desired to use it for percussion firing; the case of time fuse firing remains to be considered, which necessitates laying for elevation. The method employed consists in limiting the movement of the arm in elevation by means of a stopping device. The height of burst is a function of the corrector, the angle of sight and the dispersion in elevation. Three graduated sectors are provided which can turn, independently of one another, around a horizontal axis and carry the stop with them. By placing these sectors correctly, the arm and the dummy shell which it carries are arrested at the desired height; but the shell is not always displaced in a vertical line; in the case of adjusting the corrector, the point of burst is displaced on the trajectory, that is to say, as has already been remarked, it approaches or recedes from the gun. The movement for the displacement of the point of burst on the trajectory is obtained with the assistance of the arrangement indicated in the diagram, Fig. 6. The arm M, $M^1$, Fig. 6, which is integral with the base F turns around the axis R; in this movement of horizontal rotation the arm carries with it the shell which slides in the line of fire. The divisions $t$ are calculated for displacements on the trajectory and in the line of the fire K, L. In the case of corrections of the angle of sight, a horizontal sector called the angle of sight sector is also provided, which carries with it the arm and changes the position of the point of burst in the line of fire. This last operation has for its object to bring back the point of burst to the same vertical line which it occupied prior to the correction for angle of sight. The correction for angle of sight entails, as is known, the displacement of the point of impact and consequently the change of the trajectory.

The two preceding operations of laying for elevation—a pivoting movement on the two axes, vertical and horizontal—have the effect of carrying the point of burst out of the line of fire. This drawback has been corrected by an elongating device, the diagram of which is shown in Fig. 7. The length of the arm M, $M^1$ does not remain invariable, and it can be modified according to the case in question. When the stop occupies a position which corresponds to the height of burst M, $M^{11}$, it is known that the point of burst is outside the line of fire by a given number of millimetres. A simple trigonometrical calculation gives the amount of elongation. The point of burst is brought back into the line of fire by lengthening the arm; working in the same manner as in the case of displacement of the point of burst on the trajectory.

The following Figs. 8 to 13 permit the method to be easily understood by which the conditions referred to above have been satisfied in the complete apparatus.

Figure 1:
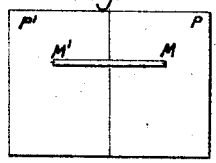
Figure 1 is a plan in relief of an objective zone.
Figure 2:
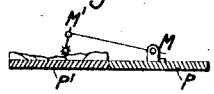
Fig. 2 is a vertical sectional view of the same.

Fig. 2′ is a perspective view of the same with a sheet applied.

Figure 3:
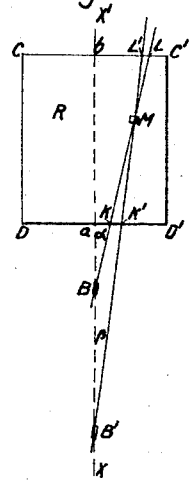

Fig. 3 is a diagram illustrating the use of the apparatus.

Figure 4:
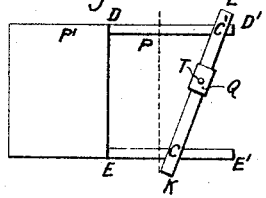

Fig. 4 is a diagram of the layout of the line of fire in the objective zone.

Figure 5:
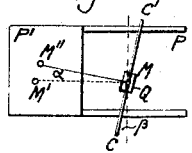
Figure 2:
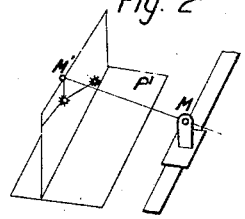

Fig. 5 is a diagram illustrating how the shots marked in the manœuvring field are projected onto the observation field.

Figure 6:
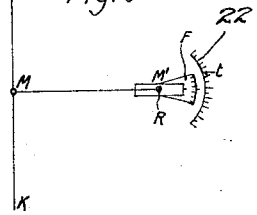

Fig. 6 is a diagram indicating how the movement for the displacement of the point of burst on the trajectory is obtained.

Figure 7:
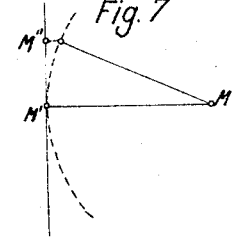

Fig. 7 is a diagram of an elongating device.

Figure 8:
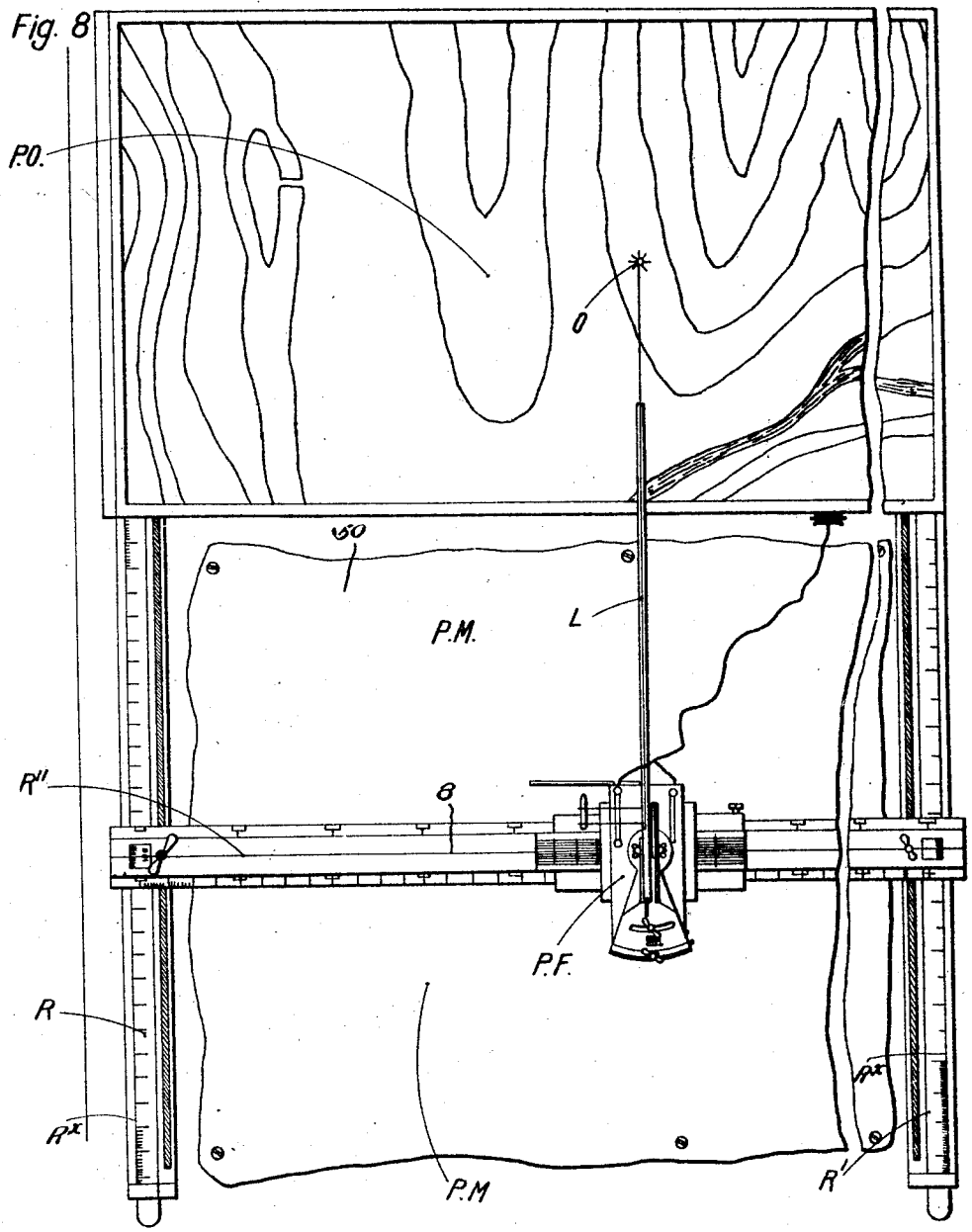

Fig. 8 shows the whole apparatus in plan.

Figure 9:
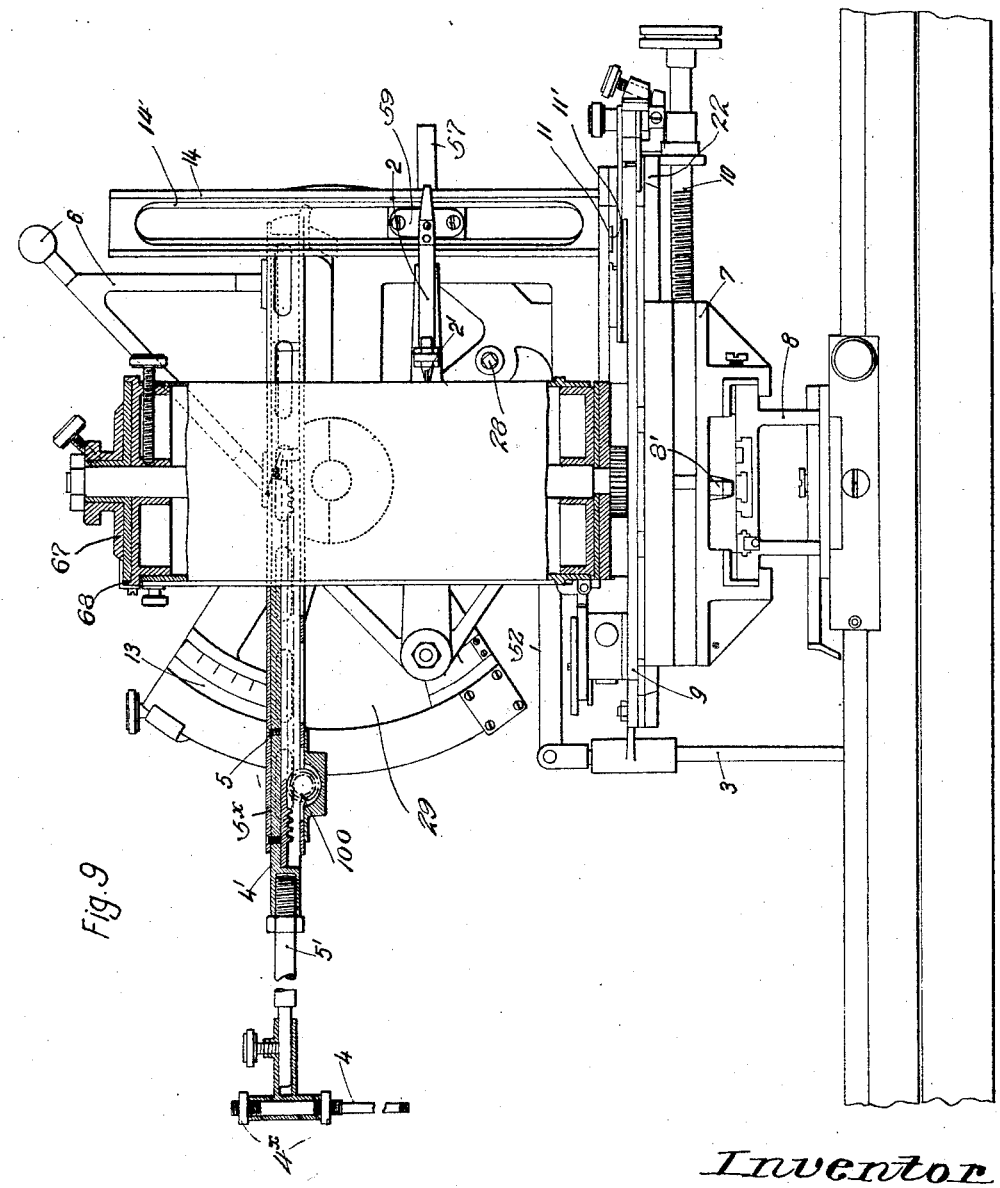

Fig. 9 is an elevation of the complete instrument by means of which the different manipulations are carried out.

Figure 10:
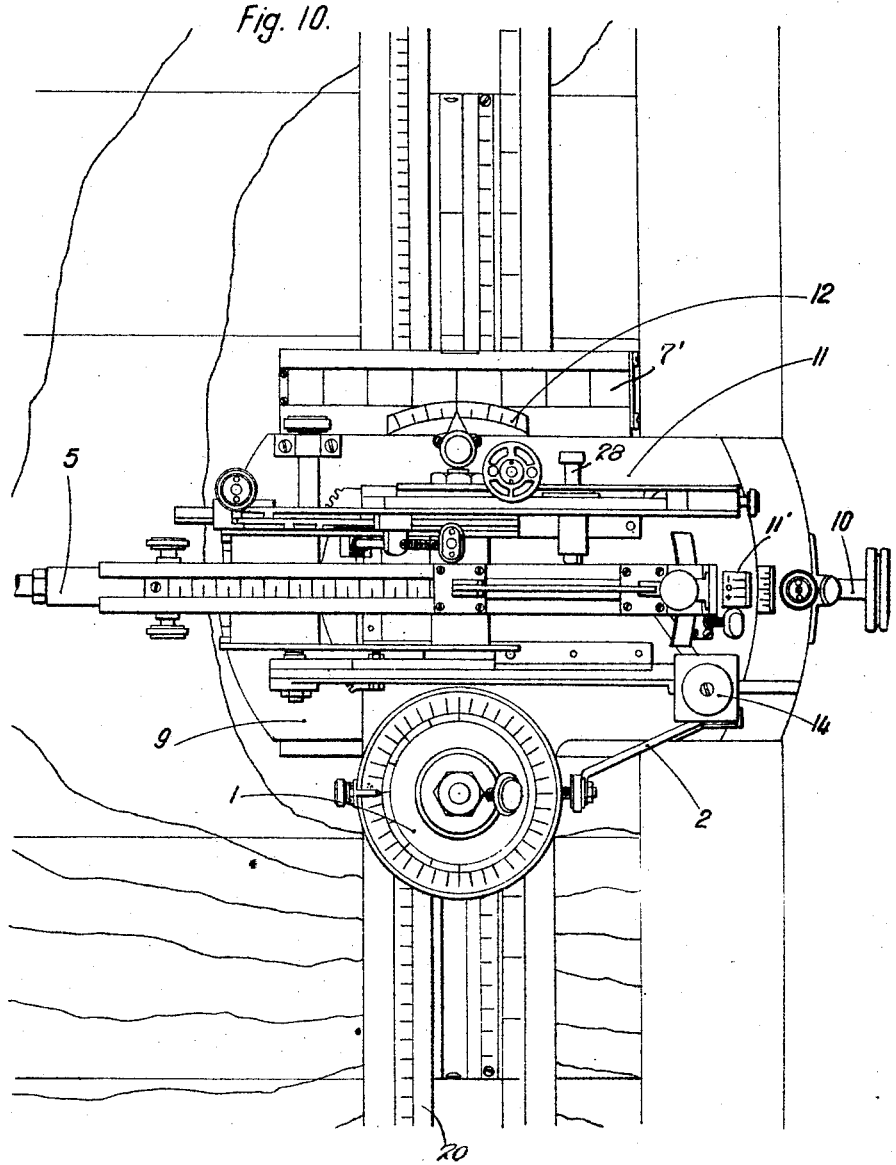

Fig. 10 is a plan corresponding to the elevation given in Fig. 9.

Figure 11:
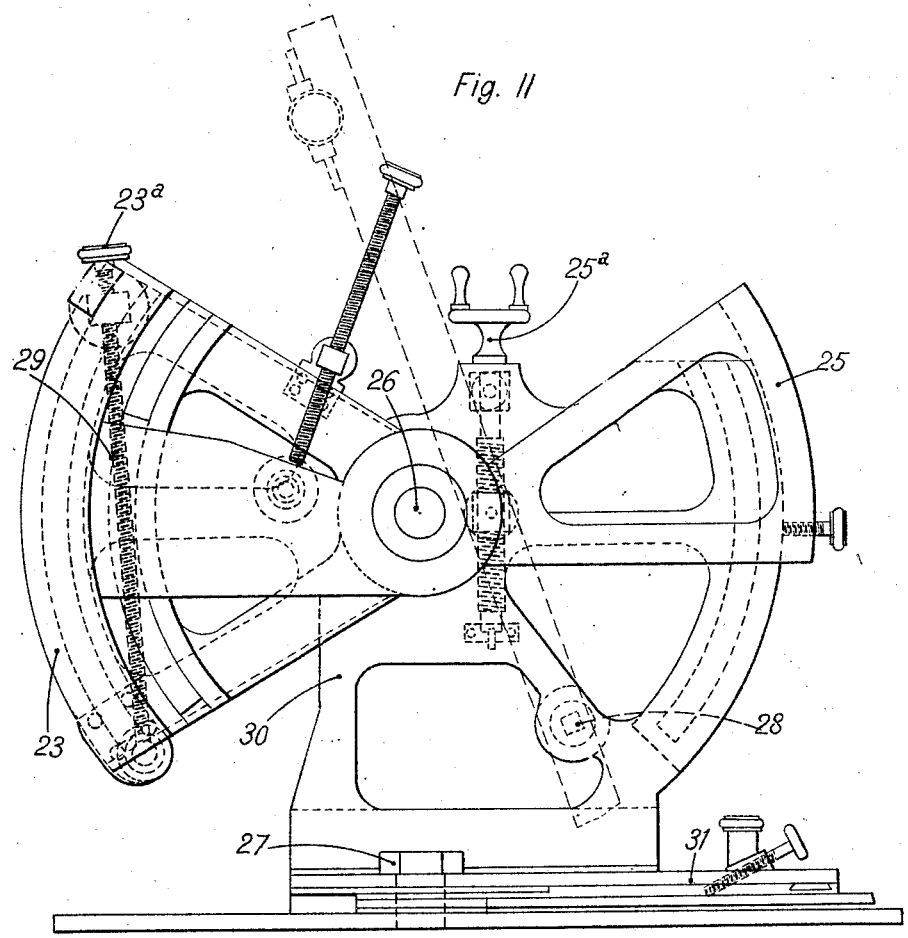

Fig. 11 is another view in elevation showing the part of the instrument behind the recording drum after the latter has been removed.

Figure 12:
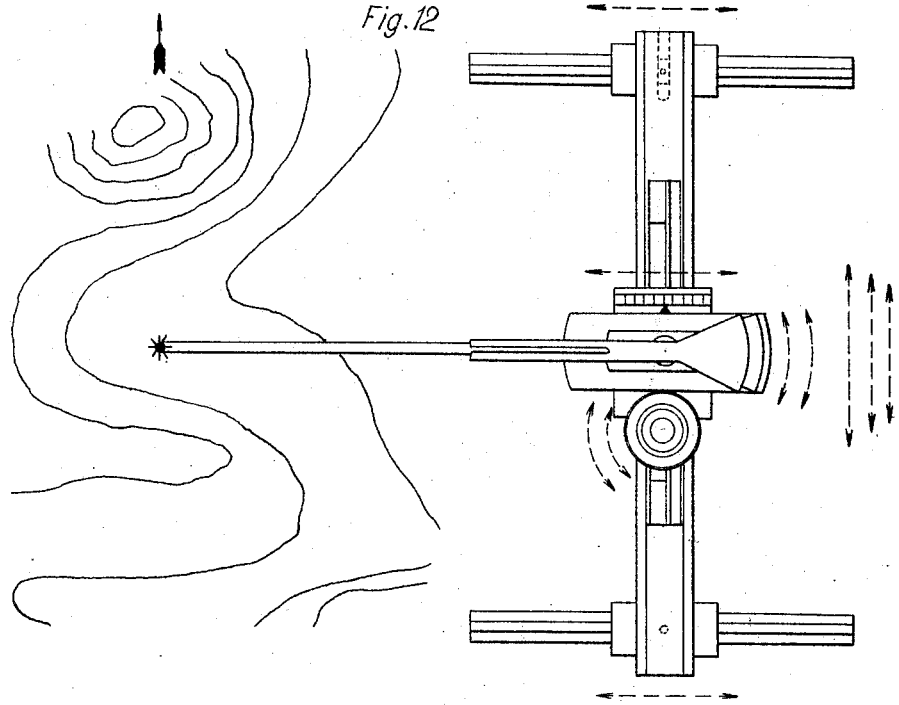
Figure 13:
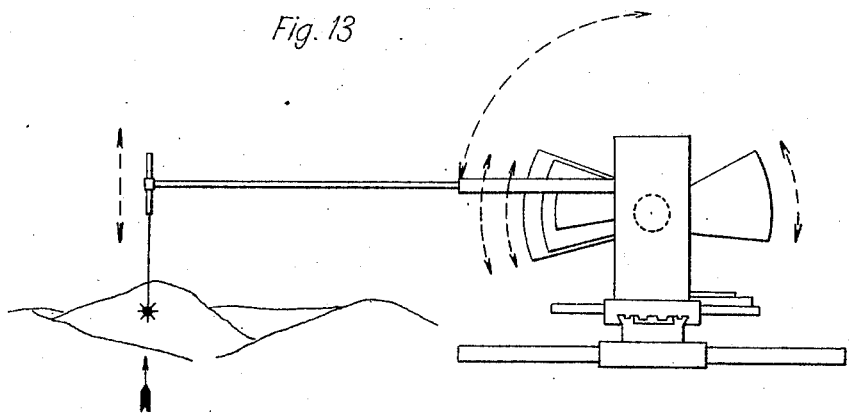

Figs. 12 and 13 are diagrams of the fourteen displacements previously mentioned.

Figs. 14 and 15 are detail views of the recording device.

Figs. 16 and 17 are plan views of the records.

In order to simplify the description, the latter has been restricted to describing the essential parts of the various mechanisms forming the complete apparatus.

Fig. 8 shows the two parallel fields for observation and manœuvring. The observation field P, O consists of a plan in relief on a scale of say 1/1000 and exactly represents the ground of the district selected.

This plan in relief is constructed in two parts in order to make it more conveniently transportable; with regard to the manœuvring field P, M, it is here that all the orders given to the imaginary battery are executed and recorded by the recording indicator indicated at P, F, the arm which has been referred to and which carries the dummy shell O being shown at L. The two graduated goniometric scales mentioned in the description of the arrangement shown in Fig. 4 are indicated at R and $R^1$ and are provided with levelling and clamping screws for attaching them to a table; the transverse scale is indicated at $R^{11}$; it is on this scale that the entire recording indicator P, F can slide. This recording indicator is merely indicated in Fig. 8. It is described in detail further on.

The area enclosed in boundary line P, M shown on the manœuvring field, registers all the imaginary shots fired by the recording indicator as regards direction and range; it is on the same scale of 1/1000 as the plan in relief P, O and represents all the objectives of the latter, the vertical intervals of the area lines being equal to one metre.

The two scales R and R¹ are slidably mounted in grooves R× and are interchangeable in accordance with the calibre of the gun and the firing distance (for every thousand metres). They are graduated on both sides in divisions of the laying apparatus for the gun with which the firing is supposed to be carried out. On the flat surface of the goniometric scales lines are marked which indicate the different bearings of the observation field for the recording indicator. The position given to these two scales directs the line of fire (displacement No. 1 deflection).

The elevation scale which, as its name implies, serves to give the range to the recording indicator is shown at R¹¹ on the manœuvring field P, M, it is, in fact, the scale C C¹ indicated on the diagrams, Figs. 4 and 5; it is provided at its extremities with guides which permit it to slide on the goniometric scales R and R¹. This movement corresponds to displacement No. 3 (elevation). This part R¹¹ is provided with the scales and graduations necessary for carrying out the different manœuvres ordered, such as displacements No. 4 (angle of sight for percussion fire) and No. 5 (dispersion in range); and a small elevation scale 20 (Fig. 10) graduated in degrees and minutes is made interchangeable according to the calibre and range of the gun. This scale 20, which constitutes a form of slide-rule, enables the three above-mentioned displacements to be correctly carried out. The displacement No. 6 (corrector for fuse) is obtained by turning the base, and with it the dummy shell carrying lever 5, about a vertical axis by means of the toothed sector 22 (Fig. 6). The displacement No. 7 (angle of sight for time-fuse fire) is similar to that just mentioned, the object being to bring back the point of burst onto the vertical line passing through the objective, as previously explained in connection with the diagram, Fig. 6.

Figs. 9, 11 and 10 show in elevation and in plan, views of the instrument as it is constructed and which consists in its essential parts of a frame, a carriage for the recording indicator, a dummy shell carrying lever, and two recording devices for the shots fired.

The frame consists of an aluminium slide 7, which may be displaced on the elevation scale 8. This is displacement No. 3 for elevation. In a groove perpendicular to the displacement of the frame 7 on the elevation scale 8 is placed a small scale 7' for dispersion in direction; the frame 7 is also provided with an index 8' for reading alterations in range.

The trolley 9 carrying the carriage for the recording indicator slides on the inverted V-shaped track 8 in the frame 7 and is adjustable perpendicularly to the plane of the latter by means of a feeding screw 10; it carries the pivoting axis for the trolley and a small range correction plate. The transverse movement of the trolley 9 denotes the dispersion in direction (displacement No. 2). A platform 11 carried by the trolley 9 pivots around the central axis, and its index 12 serves to mark the different angles which must be given to the platform with relation to the axis of the elevation scale 8 to correct the errors in range at short distances. A moving angle of sight sector 11' is also carried on the platform 11 in addition to the special members for this sector.

The carriage for the recording indicator is provided with a base 31 and two cheeks 30 (Fig. 11); the base 31 can pivot around the vertical axis of the frame pivot 27. The left cheek carries the recording arrangement for the time shots 1 and the right cheek carries the stop bolt 28 for the shell carrying lever 5 as well as the slide for the scale for dispersion in elevation. The following parts turn around the horizontal axis 26 which traverses the two cheeks 30, viz: the stop 28 for the shell carrying lever 5, the vertical angle of sight sector 24, the vertical corrector sector 23, and finally the vertical sector 25 for dispersion in elevation. By means of these vertical sectors, which are partly seen at 13 (Fig. 9) and more fully in Fig. 11, the three displacements Nos. 8, 9 and 10 are effected and a height of burst is obtained which is the resultant of the orders "corrector," "angle of sight," and "dispersion in height" given by the officer in charge of the firing. In order to indicate the "angle of sight" (displacement No. 9) the stop 29 is displaced with respect to the sector 24 by turning the screw 24ᵃ. In order to indicate the "corrector" (displacement No. 8) the sector 24, and with it the stop 29, attached thereto by means of the screw 24ᵃ, is displaced with respect to the sector 23 by turning the screw 23ᵃ. Finally, in order to introduce displacement No. 10 (dispersion in height), the sector 23, and with it the sector 24 and stop 29 connected by their respective screws, is displaced with respect to the cheek 30 by turning the screw 25ᵃ, thus moving the vertical sector 25. Then the stop 29 and the shell-carrying lever 5 will have described about the horizontal axis 26 an angle which will correspond with the resultant of the three orders "corrector," "angle of sight," and "dispersion in height" and with the height of burst.

All the graduations are calculated to obtain a vertical displacement of the dummy shell carried by the shell carrying lever in the line of fire of the recording indicator equal to the values given in the range tables.

The shell carrying lever 5 projects the captive dummy shell over the plan in relief; its downward movement is arrested by the contour map itself in the case of percussion firing and by the stop 28 on the carriage in the case of time fuse firing. It consists essentially, as shown in Fig. 9, of a sleeve $5^x$, a slide $4^1$, a long stayed rod $5^1$ at the end of which is carried the member 4 representing the captive shell. Means 100 of the rack and pinion type are provided as shown for adjusting its length exactly. While the several orders above-mentioned are being carried out the lever 5 is held in a substantially vertical position by the bolt 28, but on their completion it is freed and either falls on to the plan in relief in the case of percussion fire, or, in the case of time-fuse fire, is arrested in its downward movement by the stop 29 at a predetermined height, thus reproducing the displacement No. 13 (departure of shell). Finally, displacement No. 14 (change of altitude in firing position of battery) is reproduced by moving the lever 5 vertically with respect to the member 25′ which carries the altitude divisions.

The means for setting the shell carrying lever are clearly shown in Fig. 9. The length can be increased or decreased by a simple rack and pinion device 100, the rack being integral with the sliding part 4′ of the lever. The shell carrier member 4 can be adjusted readily and locked in position by the nuts $4^x$.

The shell carrying lever 5 in turning on the horizontal axis of the carriage describes a circle and consequently causes the dummy shell to recede from the line of fire. To correct this drawback the shell is brought back into the line of fire by elongating the lever as has been described above.

The apparatus which has been briefly described, automatically records all the shots fired either as regards direction and range or elevation and range; this is one of the characteristics of the apparatus. The recording for direction and range is made on the contour map for the manœuvring field by means of a pencil shown at 3, Fig. 9, actuated by the shell carrying lever. While the orders are being carried out the marking pencil is raised. At the moment of firing the shell-carrying lever liberates the mechanism which holds the marking pencil; the latter then falls on to the contour map and marks the point where the shot falls. When the lever is raised a return spring again raises the pencil.

The record for elevation and range (time fuse firing) is effected on a sheet of paper rolled on a drum 1. The development of the surface of the drum is the same as that for the depth of the manœuvring field reduced to one quarter. On a small column 14 parallel to the axis of the cylinder of the drum 1 and of the same height as the latter, a member $2^a$ slides and turns and carries an arm $2^2$ to which is fixed the pencil $2^1$ which can be applied to the paper on the drum. The sliding member $2^a$ is connected with suitable mechanism controlled by the shell carrying lever for adjusting the position of the marking pencil to a position corresponding with the height of burst observed.

Figs. 11 and 12 relate to the recording device and Figs. 13 and 14 to the appearance of the records. The device gives automatically a record in two planes, horizontal and vertical of the results of the firing, and this is one of the main features of the apparatus. During the percussion fire the shots are recorded both in direction and range, in a horizontal plane represented by a sheet of paper shown in 50, Figure 8, and fixed on the field. It is the horizontal projection, of the points struck, in the horizontal plane passing through the mouth of the gun.

The recording is automatically obtained by the use of a pencil shown at 3, Figures 9 and 14, said pencil being moved by the lever 52. During the execution of the orders, the pencil is raised through the intermediary of the shell carrier or lever 5. At the time of firing, the said lever swings round the horizontal axis 53, sets free the lever 52, and the pencil (pushed by the spring 54) moves down and makes a mark where the shell struck.

For the time fire, the shots are recorded as to height and range (the height at which the shell burst) on a vertical plane represented by a sheet of paper disposed on a drum, shown at 1, Figure 9.

In order to reduce the size of said drum, the plane is reduced to the fourth of the horizontal plane spoken of above. In order to obtain said reduction for all positions, that the lever carrying the shell can take, the following device is used. The stop 55, Figure 9, determines the height of bursting, it is integral with a sector 56 gearing with another sector 61′, Figure 11, fixed to the arm 57, the length of which is equal to a fourth of the lever carrying the shell. The arm through the ball joint 58 entrains the vertical slide 59 sliding on the vertical member 14′ parallel to the axis of the cylinder 1. Said vertical slide carries a bent arm 2, Figures 9 and 15, on which is fixed the recording pin 2′.

The member 14′, on which slides the piece 59, can turn in the inside of an external small column 14; said rotation entrains piece 59 moves the arm 2 which permits the marking pin to touch the sheet of paper rolled on the drum 1.

The rotation of the internal member 14′ is obtained through the agency of an articulated arm 60, integral with a member 61, which is entrained by the spring 62, said member 61 carries a stop 63.

The recording of the time fire is automatically carried out by the lever carrying the shell which when raised up abuts against the block 63 pushing the marking pin 2′ of the drum. At the time of firing, the shell-carrier sets free the block and the articulated arm, pushed by the spring, turns round the internal member 14′ till the pin marks, the bursting point on the drums.

In order to record the range in time fire, the drum 1 is entrained by the vertical axis 1′, which rotates through the agency of a pinion 64 in gear (with a ratio of ¼) with a sector 65, Figures 9 and 15.

Said rotation takes place each time that the bursting point is displaced on the trajectory by means of the rotation of the carriage round the central axis 66, Figure 15.

The axis 1′ carries a circular plate 67, on which are graduation in range reduced ¼. In order to record on the drum, the variations of the distances, on account of the displacements of the frame 7 on the member 8, Figure 9, the drum is turned round by hand in order to bring its index 68 in front of the division corresponding to the plate 67.

It is easy to understand how very useful it is for the teaching of artillery men to have such two planes for recording the shots. After each lesson, the pupil who has fired receives two sheets of paper on which are indicated, on three dimensions, all the points struck. It is easy then to make a criticism of the whole of the firing. Figs. 16 and 17 show the condition of the records after a pretty long firing.

Fig. 16 shows the record on the sheet of paper which was placed on P. M., Fig. 8, while Fig. 17 shows the record, in height, marked on the sheet of paper placed on the drum of the recording device. The black spots on Fig. 16 are marked by the device 3 and the black spots on Figure 17 are marked by the device 2, Figs. 14, 15 and 9.

The use of the observatory is the following: An observer looking through the field glass directed on the relief plane is in fact situated as if he were looking on a real ground. The whole landscape is reduced to a scale of $\frac{1}{1000}$ and one looks on it at a distance a thousand less. It follows that practically there is no change as to the valuation of the angles observed.

In order to complete the recording arrangement the drum 1 turns on its own axis and thus presents different parts of its surface to the point of the marking pencil.

The point of burst is a function of the range (elevation), the dispersion in range, and the correcter. Consequently the upper part of the drum 1 is provided with the necessary circular moving scales (elevation and range) which by their displacements cause the recording drum to turn by a suitable amount. For the distance of burst, due to the correcter, the carriage causes the drum to turn automatically by means of a pinion which gears with a toothed sector. This rotation of the drum effects the displacement No. 11 (fuse setting). By clamping the drum 1 by means of a set-screw to the central spindle 27, the movement of the drum carries with it the base and dummy shell-carrying lever 5, and thus reproduces displacement No. 12 (dispersion in range for time-fuse fire). In consequence of the reduction allowed for, the pencil will mark the distances of burst on the scale of one quarter.

The apparatus described above is completed by observation positions, the sole object of which are to represent, in the room in which they are located, an observation post which corresponds to actual conditions.

Preferably the observation post consists of a telescope mounted on a tripod, and provided with a micrometer and a focussing screw with an eyepiece. An index permits the angles of sight to be read, and the telescope may be displaced in the horizontal plane in order to measure the angles for direction; the apparatus is completed by the provision of devices used for observation purposes and it is placed perpendicularly to the parallel maps and in such a manner as to allow the plan in relief to be under complete observation. The apparatus is further supplemented by a number of accessories intended to create on the plan in relief a series of effects which approach those experienced under war conditions. Amongst these effects may be mentioned those of the time fuse firing; the captive shell is represented by a small electric lamp which lights up when the shell carrying lever meets the stop which adjusts the elevation, etc.

The following particulars will complete the description: The speed of firing may attain five to six shots per minute, the equipment is arranged for operation by three gunners and a person in charge. The apparatus can be assembled and taken apart with the greatest facility in twenty minutes.

The problems relating to percussion firing and time fuse firing may be handled with the same facility and the possibility of being able to record all the shots fired gives the apparatus an essential quality, namely, that of permitting on completion of the firing practice the discussion of the results obtained by the registering of the recording indicator.

The small space it occupies, due to the fact that the zone of fire is only represented on the plan in relief is a valuable quality as it permits its rapid erection on an ordinary table in a room of average size.

Having now particularly described and ascertained the nature of my said invention and in what manner the same is to be performed, I declare that what I claim is:—

1. Apparatus for practicing miniature range firing comprising a manœuvring field, an observation field parallel and contiguous thereto, said observation field including the objective zone only and being a relief plan on which are clearly indicated all the particular details of the ground for the district selected, in combintion with an instrument disposed on the manœuvring field and adapted to be manipulated as a dummy gun in accordance with orders given and to automatically record on the manœuvring field all the percussion shots.

2. In an apparatus as set forth in claim 1, an articulated lever which carries a dummy shell at one of its extremities mounted on a recording indicator; the length of this lever being such that the dummy shell can touch all the points of the objective zone, substantially as described.

3. In apparatus as set forth in claim 1, a scale corresponding to an elevation scale on which the recording indicator is adapted to slide and turn about a horizontal axis; a range scale sliding at its two extremities on two parallel goniometric scales forming the short sides of the manœuvring field so that the inclination which the range scale assumes relatively to these two parallel scales will enable the line of the recording indicator to coincide with the line passing through the objective.

4. An apparatus as claimed in claim 1 including a drum and marking mechanism for recording the elevation shots (time fuse firing).

In testimony whereof I affix my signature.

ANDRÉ VALENTIN BARANOFF.